United States Patent [19]
Nash

[11] 3,943,707
[45] Mar. 16, 1976

[54] GAS TURBINE ENGINE EXHAUST NOZZLE DIVERTER VALVE

[75] Inventor: Dudley O. Nash, Cincinnati, Ohio

[73] Assignee: General Electric Company, Cincinnati, Ohio

[22] Filed: Oct. 23, 1974

[21] Appl. No.: 517,217

[52] U.S. Cl. ............... 60/229; 60/230; 239/265.29
[51] Int. Cl.²... F02K 1/00; F02K 1/20; B64C 15/04
[58] Field of Search.................... 60/229, 230, 204; 239/265.29; 251/162, 163

[56] References Cited
UNITED STATES PATENTS

| | | | |
|---|---|---|---|
| 3,035,411 | 5/1962 | Porowski | 239/265.29 |
| 3,180,362 | 4/1965 | Muller | 251/163 X |
| 3,675,894 | 7/1972 | Friedell | 251/163 |
| 3,684,183 | 8/1972 | Baerresen | 239/265.29 X |
| 3,837,411 | 9/1974 | Nash et al. | 60/229 X |

Primary Examiner—C. J. Husar
Assistant Examiner—Thomas I. Ross
Attorney, Agent, or Firm—Lee H. Sachs; Derek P. Lawrence

[57] ABSTRACT

An improved gas turbine engine exhaust nozzle diverter valve is provided to selectively direct the flow of motive fluid through one of two nozzle exhaust ports and to provide improved sealing to prevent the flow of fluid through the second nozzle exhaust port. Linkage and actuator means are provided to retract a blocker door having a deformable seal attached thereto from a first seated position over the second nozzle exhaust port, and to then rotate the blocker door to a position over the first nozzle exhaust port. The method of retracting the blocker door prior to rotating it eliminates sliding friction and minimizes the potential of damage to the seal between the blocker door and the nozzle exhaust port.

14 Claims, 11 Drawing Figures

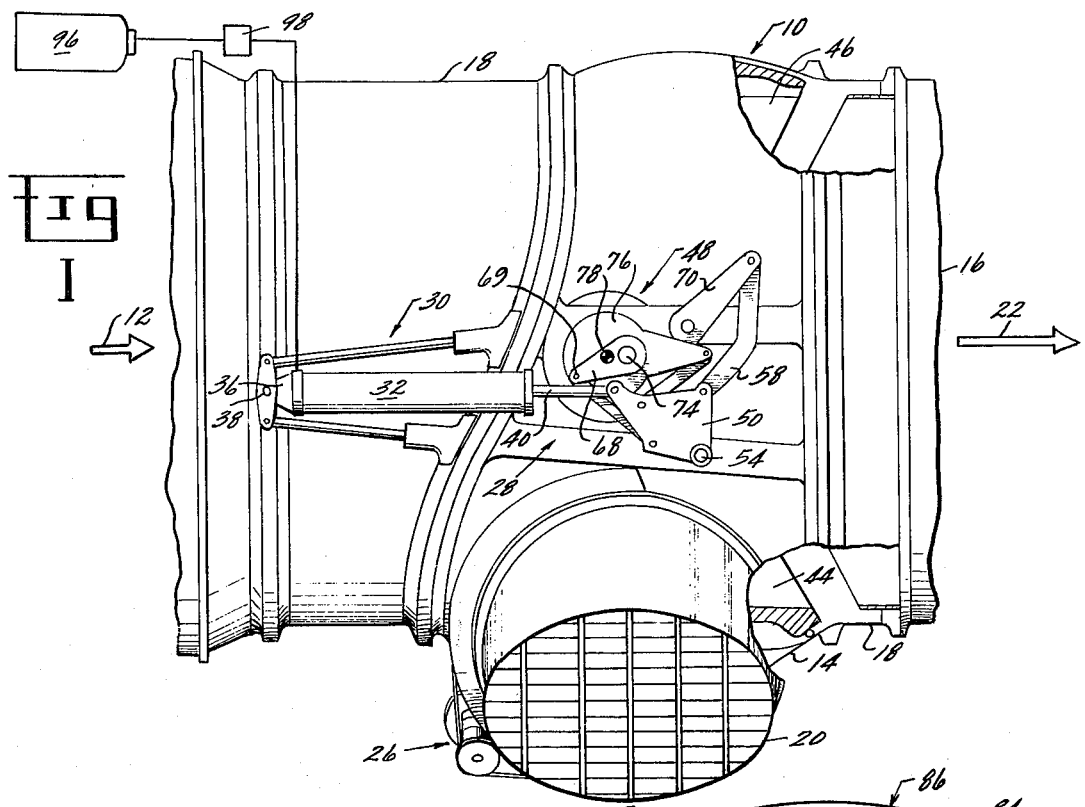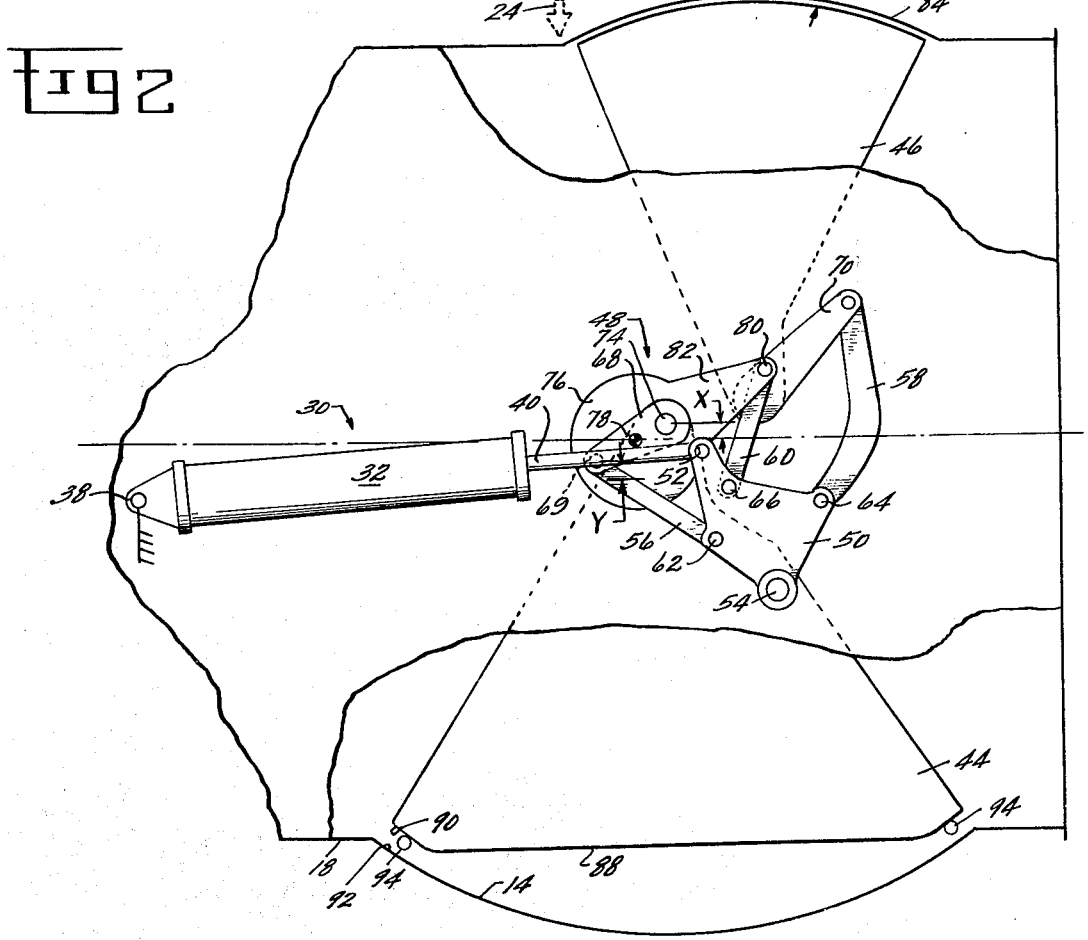

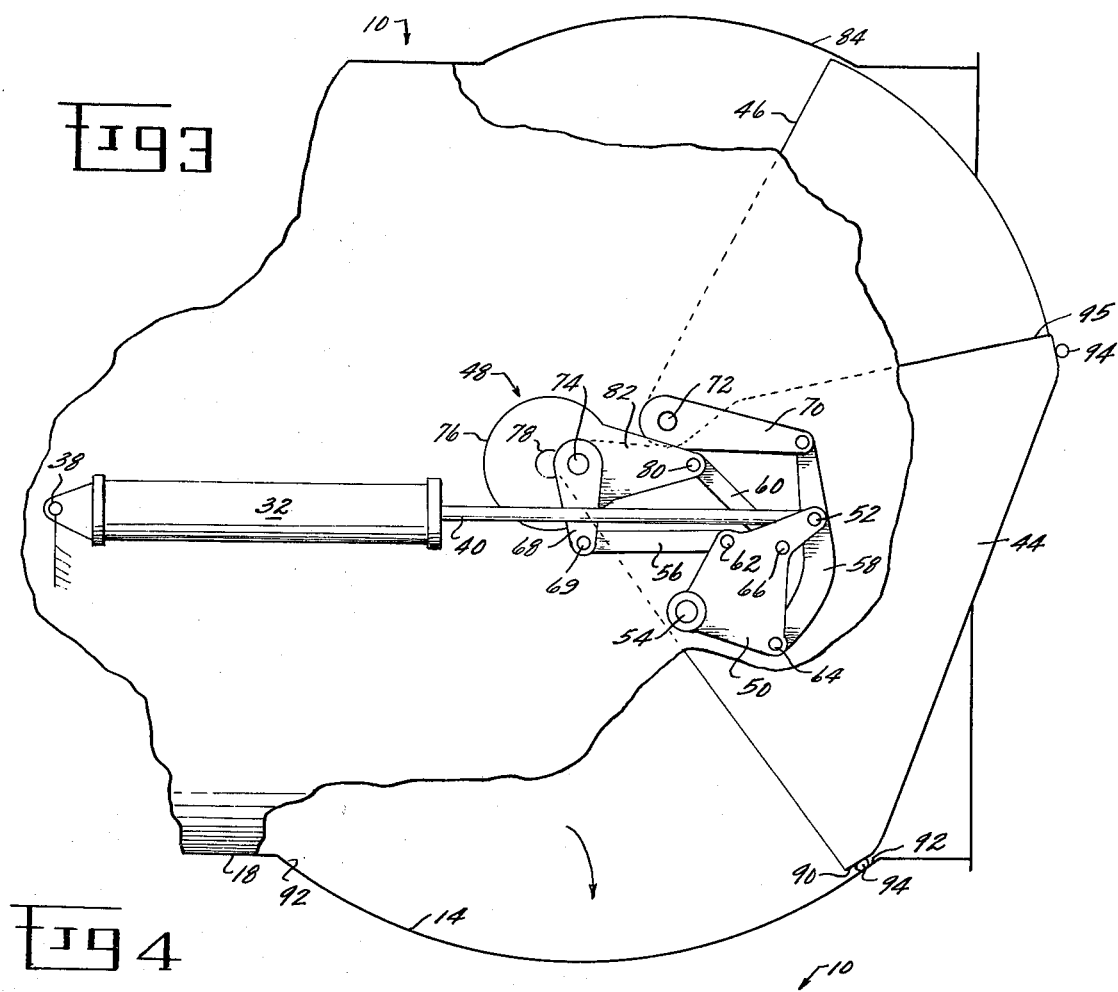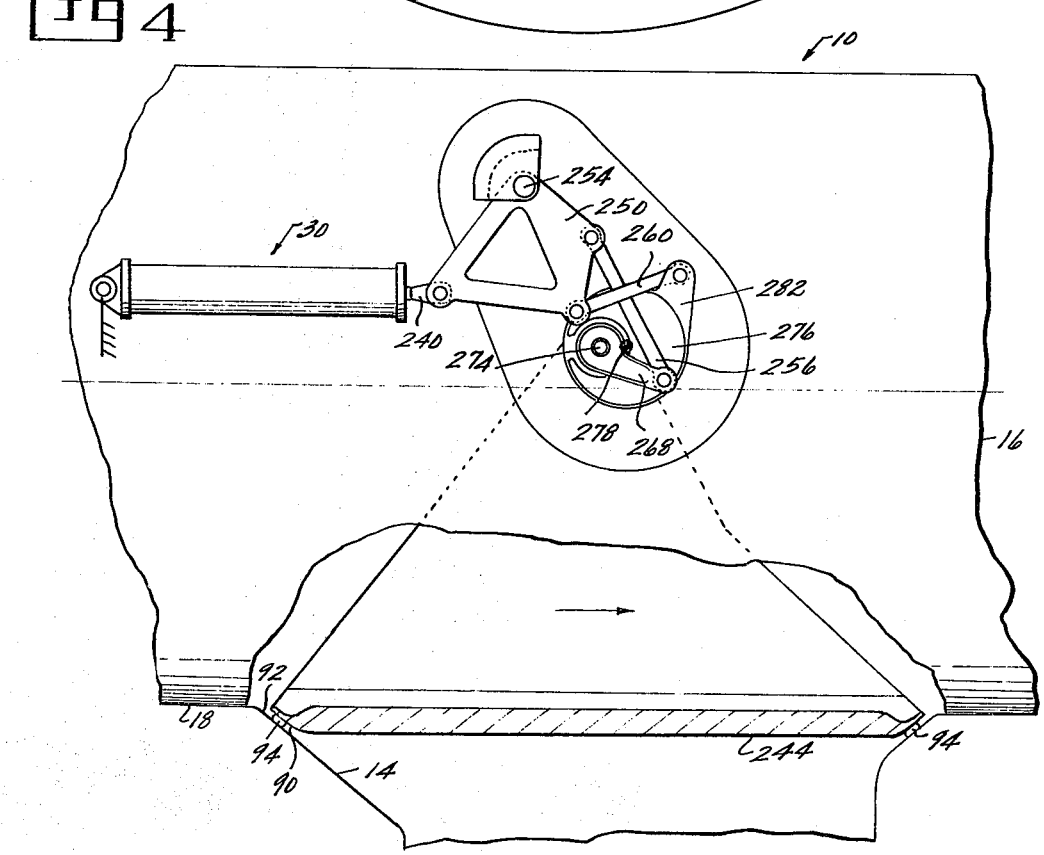

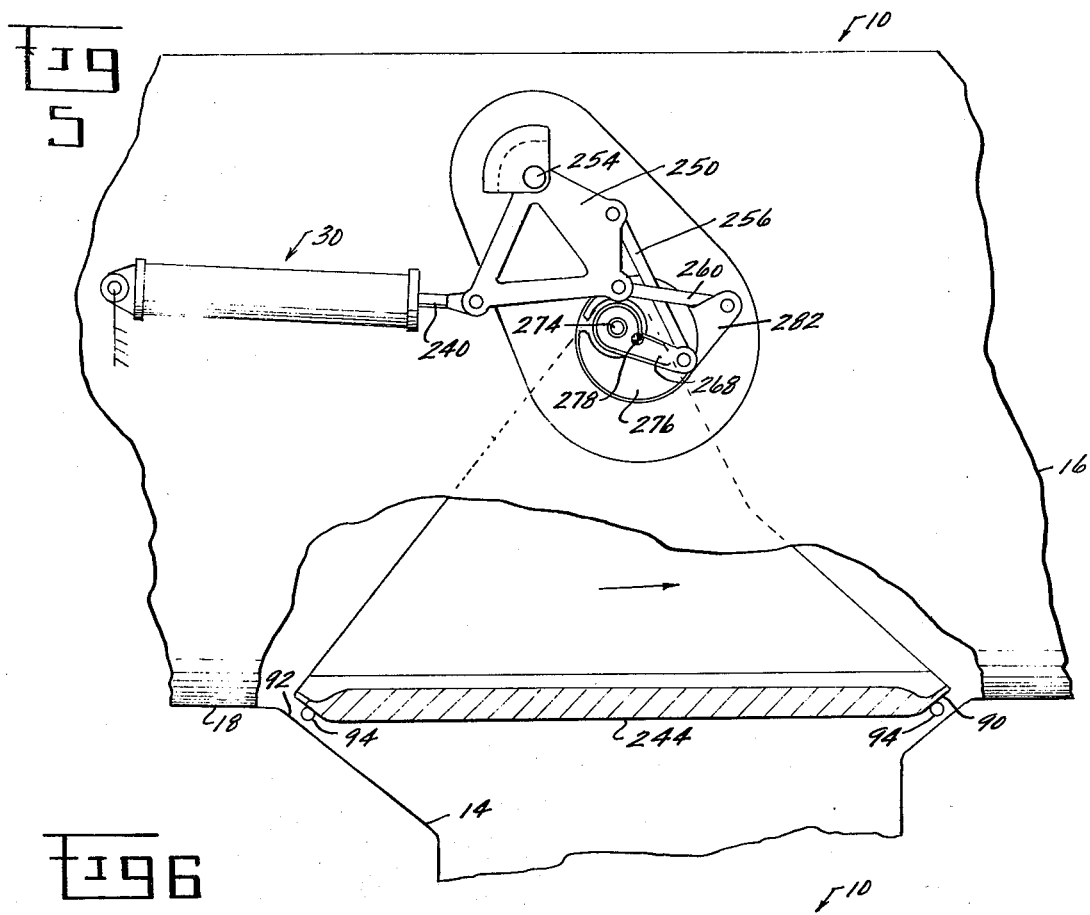
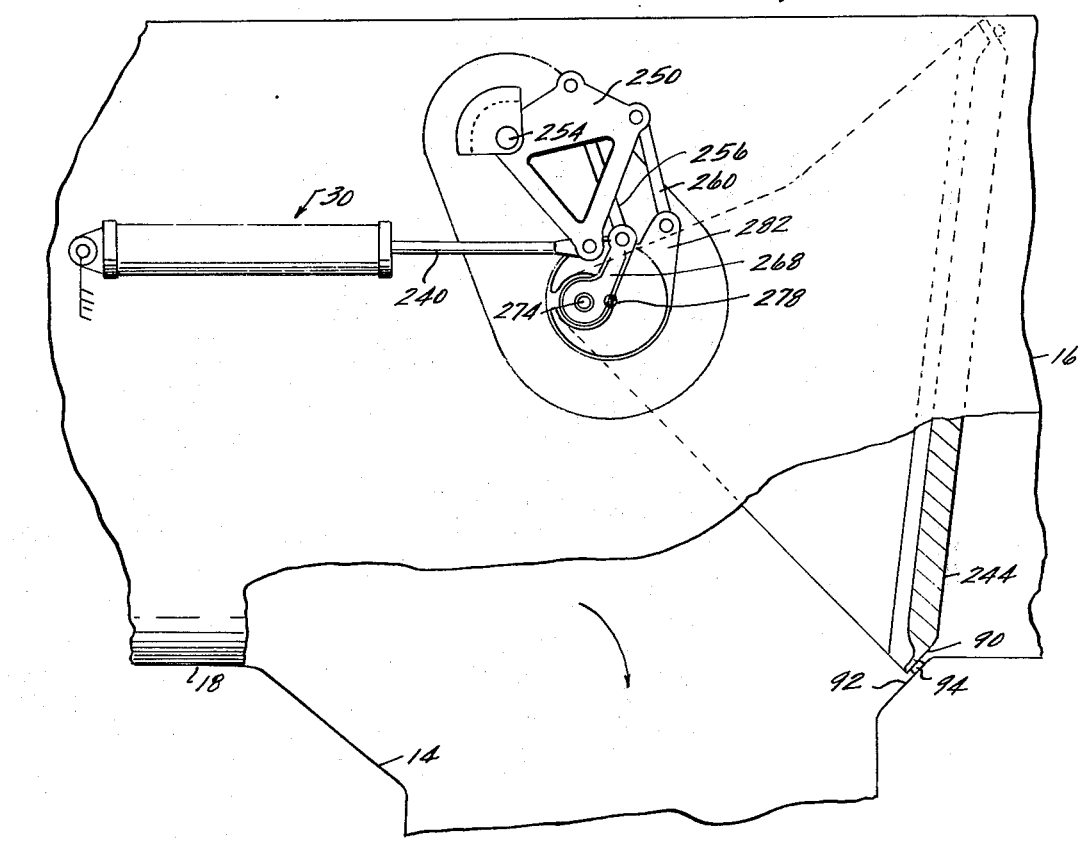

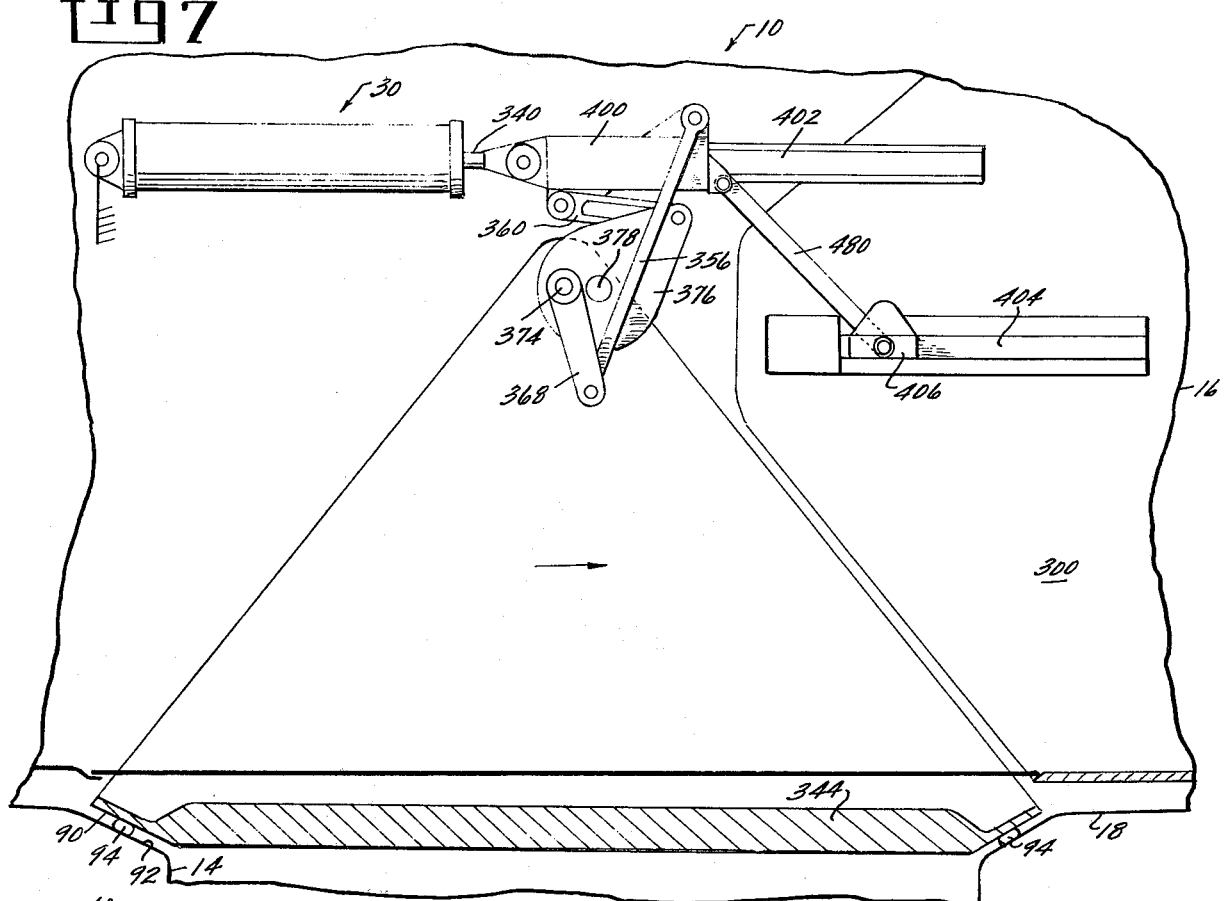
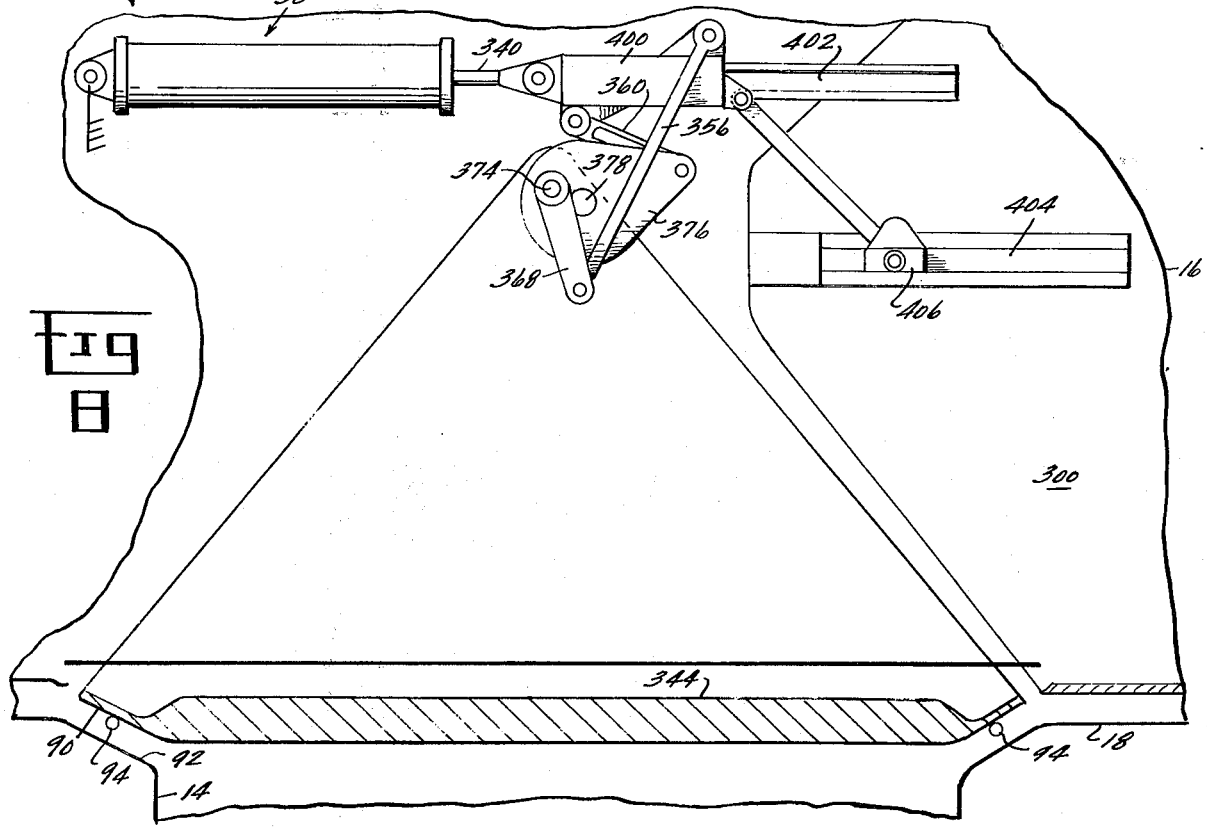

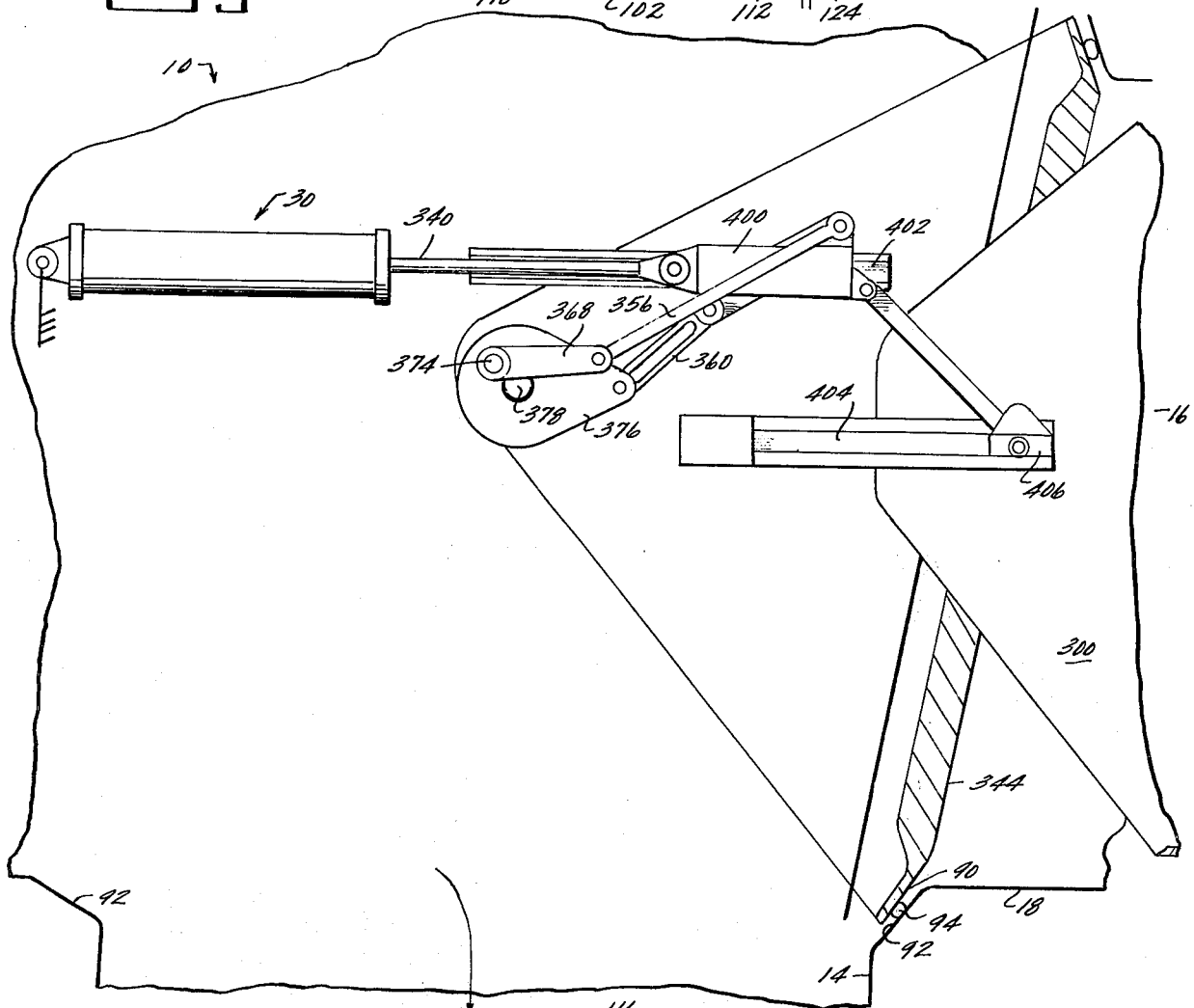
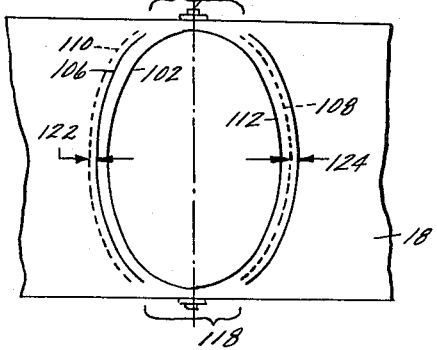

GAS TURBINE ENGINE EXHAUST NOZZLE DIVERTER VALVE

BACKGROUND OF THE INVENTION

This invention relates to gas turbine engines and, more particularly, to thrust vectorable nozzles for use therein.

The thrust produced by a gas turbine engine is substantially parallel with and opposite to the direction of the exhaust gases flowing therethrough. Therefore, if the direction of the exhaust gases exiting an engine is changed, the direction of the resulting thrust is correspondingly varied. Advanced aircraft configurations contemplate the selective redirection (or vectoring) of gas turbine engine thrust in order to improve aircraft performance and to provide the aircraft with operational characteristics heretofore deemed impractical. For example: if the exhaust of a conventionally installed gas tubine engine was directed downward, rather than rearward, to a direction substantially perpendicular to the engine longitudinal axis, the upward thrust would provide direct lift, and therefore, a vertical take-off and landing capability. Similarly, thrust vectoring in flight can greatly increase aircraft maneuverability since the thrust force can augment maneuvering forces heretofore created solely by aircraft control surfaces such as elevators, ailerons and rudders. In order to accomplish such thrust vectoring, a device is required to efficiently and practically alter the direction of gas turbine engine exhaust nozzle gases.

Target-type diverters have been utilized to divert the exhaust gases after they exit from the nozzle, but these claim shell-like devices are large and heavy and not readily adaptable to the intricate thrust vectoring contemplated for advanced engine applications. Therefore, efforts have been concentrated on diverting the exhaust gases through one of several exhaust ports of a gas turbine exhaust nozzle, one of which is normally of the swivelable, thrust vectoring type. The diversion is accomplished by selective positioning of a diverter valve (such as a swivelable door) within the exhaust nozzle. However, the effective sealing of irregular or non-precision, valve-type joints under the elevated temperature experienced in gas turbine exhaust nozzles has long been a severe problem.

In exhaust nozzle applications, the operating temperatures are too high to permit the use of available elastomer materials which could otherwise be used to assure effective sealing between the diverter valve and the nozzle exhaust port. Metallic materials are able to tolerate the temperatures involved and these, due to their relative inelasticity, are not easily conformable to the structures to be sealed. Even when manufactured as segmented seals for improved conformance, intersegment leakage can be as high as 1% of total engine airflow, resulting in a reduction of overall engine performance.

The sealing problem in lightweight, high temperature diverter valves is further complicated by the fact that lightweight sheet metal construction is inherently not conductive to an accurately fitting valve. Additionally, thermal expansion and thermal cycling accentuate the valve fit problem. And, finally, the often complex shape of the exhaust port to be sealed and the characteristic pivoting motion of the clam shell-type diverter valve segments have generally precluded the use of continuous seals.

The problem facing the mechanical designer, therefore, is to provide an effective lightweight sealing means for a high temperature, irregularly shaped, sheet metal gas turbine exhaust nozzle. Prior state-of-the-art attempts to solve this problem have been oriented toward providing a segmented bumper seal about the exhaust port upon which the diverter valve slidingly abuts. Since it is extremely difficult to construct a continuous bumper seal about an essentially circular exhaust port and still permit the diverter valve to slidingly rotate to another deployed position, and since substantial radial gaps are required between the diverter valve and the exhaust port to account for thermal growth and permit free rotation of the diverter valve, significant leakage remains in such a system.

SUMMARY OF THE INVENTION

Accordingly, it is the primary object of the present invention to provide improved sealing for a diverter valve disposed within a gas turbine flow path to preclude leakage flow between the diverter valve and the nozzle exhaust port.

It is a further object of this invention to provide an improved method for diverting flow within a gas turbine engine exhaust duct.

These and other objects and advantages will be more clearly understood from the following detailed description, drawings and specific examples, all of which are intended to be typical or rather than in any way limiting on the scope of the present invention.

Briefly stated, the above objectives are accomplished by disposing a metallic, plastically deformable material between the nozzle exhaust port and the diverter valve. Since a tight-fitting seal of this type precludes the use of diverter valve actuation by conventional rotation (due to high friction forces and potential seal damage), a linkage mechanism is provided to retract the diverter valve inward to disengage the seal before rotating it to the deployed position. This method of retracting the diverter valve prior to rotation minimizes the potential of seal damage. When the seal is engaged between the valve and exhaust port, the gas pressure loading is sufficient to contour the seal to the faces of the valves and exhaust port to precluding leakage therebetween.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings in which:

FIG. 1 is a schematic representation of a gas turbine engine exhaust nozzle incorporating the subject invention;

FIG. 2 is a cut-away schematic representation of the subject invention of FIG. 1 in a second operating condition;

FIG. 3 is a schematic representation, similar to FIG. 2, of the subject invention in a third operating condition;

FIG. 4 is a schematic representation of an alternative embodiment of the subject invention in a first operating condition;

FIG. 5 is a schematic representation, similar to FIG. 4, of the subject invention in a second operating condition;

FIG. 6 is a schematic representation, similar to FIG. 5, of the subject invention in a third operating condition;

FIG. 7 is a schematic representation of yet another alternative embodiment of the subject invention in a first operating condition;

FIG. 8 is a schematic representation, similar to FIG. 7, of the subject invention in a second operating condition;

FIG. 9 is a schematic representation, similar to FIG. 8, of the subject invention in a third operating condition;

FIG. 10 depicts schematically a prior art gas turbine engine nozzle exhaust port diverter valve; and FIG. 11 depicts schematically a cross-sectional view taken along line 11—11 of FIG. 10.

DESCRIPTION OF THE PREFERRED EMBODIMENT

Referring to the drawings wherein like numerals correspond to like elements throughout, attention is first directed to FIG. 1 wherein an essentially cylindrical gas turbine engine exhaust nozzle, depicted generally at 10 embodying the present invention is diagrammatically shown. Hot gases of combustion are expanded through a turbine (not shown) in a manner well known in the art and enter the exhaust nozzle from left of FIG. 1 as depicted by vector 12. (As hereinafter discussed, the term "exhaust nozzle" is meant to include a fan duct exhaust nozzle, or any other gas turbine engine exhaust nozzle whether or not it is preceded in serial flow relationship by a combustor.) The fluid flow of these gases is then selectively directed through either nozzle exhaust port 14 or exhaust port 16.

As represented in FIG. 2, exhaust port 14 consists of an essentially circular aperture in the exhaust nozzle casing 18 and comprises the inlet to a nozzle 20, preferably of the articulated, thrust vectoring type (FIG. 1). Exhaust port 16 provides for the discharge of fluid in the direction substantially parallel with the gas turbine engine longitudinal axis, the fluid discharge represented generally by the vector 22. The direction of fluid represented by vector 24 exiting the thrust vectoring nozzle 20 is variable, the articulation of nozzle 20 being controlled through one of a variety of state-of-the-art actuators represented generally at 26.

One form of the improved diverter valve of the present invention, represented generally at 28 in FIG. 1, is provided to selectively direct the fluid stream through either of the exhaust ports 14, 16 and to provide improved sealing to prevent the flow of fluid through the other nozzle exhaust port. In the embodiment of FIGS. 1, 2 and 3, and actuator shown generally at 30 of the piston variety is provided, the actuation having a cylinder 32 and a piston (not shown) disposed therein. The closed end 36 of the cylinder is affixed to the exhaust nozzle casing 18 by pin connection 38. The piston includes an actuator rod 40 attached thereto and extending from the free end of the actuator cylinder 32.

A pair of selectively positionable blocking means, such as blocker doors 44, 46 of the clam-shell variety, are located within the exhaust nozzle 10 and are operatively connected to actuator 30 through a linkage means, denoted generally at 48. The linkage means includes, in part, a bell crank 50 operatively connected to actuator rod 40 at 52 in such a manner that linear motion of the actuator rod 40 is converted to rotational motion of the bell crank 50 about its fixed axis of rotation 54 comprising a pin connection to the exhaust nozzle casing 18.

First, second and third links 56, 58, 60, respectively, are operatively connected to bell crank 50 at pin joints 62, 64, 66, respectively, links 56 and 60 being essentially straight and link 58 arcuate. Link 56 is further operatively connected to a first blocker crank 68 (at point 69) which, in turn, is rigidly connected to blocker door 44. Similarly, link 58 is operatively connected to a second blocker crank 70 which, in turn, is rigidly connected to blocker door 46.

Blocker door 46 and second blocker crank 70 are rotatable, at their point of connection, about an axis through pin 72 (FIG. 3) operatively connecting the two elements with the exhaust nozzle casing 18. First blocker crank 68 and blocker door 44 are similarly rotatable, at their point of connection, about an axis through pin 74 operatively connecting the two elements with an eccentric 76, the point of connection being radially disposed from the eccentric axis of rotation 78. The eccentric 76 is operatively connected to exhaust nozzle casing 18 at, and free to rotate about, axis 78.

A third link 60 is provided to induce rotation of the eccentric 76 about axis of rotation 78, the link connecting bell crank 50 and eccentric 76 at joints 66 and 80, respectively. Joint 80 is located upon a lifting cam 82 protruding from eccentric 76 and is in essentially radial alignment with the eccentric axis of rotation 78 and pin 74.

As depicted in FIGS. 1 and 2, nozzle casing 18 is provided with a spherically curved surface 84 adapted to receive in spacial relationship the concentric spherically shaped blocker door 46 in its stowed position. Such spherical surfaces ensure that, as blocker door 46 is rotated about its axis of rotation at pin 72, the clearance 86 remains essentially constant to preclude binding therebetween.

Blocker door 44 comprises an essentially cylindrical segment coaxial with the exhaust nozzle 18, having face 88 covering, in the stowed position of FIG. 1, first exhaust port 18. Cooperating valve seats 90, 92 are provided about the perimeter of face 88 and exhaust port 14, respectively, and a continuous conformable seal 94 disposed therebetween to provide improved sealing. As depicted in FIGS. 1 through 3, the seal 94 is affixed to valve seat 90 and is contemplated to comprise a metallic, plastically deformable structure such as a crushable, open-face, honeycomb structure. In its position and embodiment represented in FIG. 1, the seal 94 is deformed by crushing to conform to the contour of valve seats 90, 92 thereby precluding leakage therebetween.

In operation, the exhaust gases are directed through the second exhaust 16 as represented by vector 22 of FIG. 1 thereby creating a thrust vector opposite in direction to vector 22, (i.e., axially forward along the engine longitudinal axis). Attention is now directed to FIG. 2, as the diverter valve is sequenced to divert flow from exhaust port 16 to exhaust port 14.

As actuator 30 is pressurized by means of a pressure source 96 and control means 98, the piston 34 and actuator rod 40 are linearly extended, thereby producing a clockwise rotation of bell crank 50 about rotational axis 54. During a first predetermined portion of actuator rod travel (movement between the position of FIG. 1 and that of FIG. 2) bell crank 50, arcuate second link 58 and second blocker crank 70 cooperate in a manner such that the blocker door 46 is substantially irrotational about its axis 72. Contemporaneously, rotation of the bell crank 50 causes a counterclockwise rotation of the eccentric 76 and the lifting cam 82 through link 60, along with the raising of the first blocker crank pin axis 74 as it orbits about the eccentric axis of rotation 78. Thus, the blocker door 44 is retracted in a non-frictional manner, as by lifting in the embodiment shown, by a distanct X in FIG. 2 equal to the vertical travel of the first blocker crank pin axis 74, thereby disengaging seal 94 from the valve seat 92. Although blocker door 44 is lifted, it and its associated first blocker crank 68 maintain the same angular orientation with respect to the engine exhaust nozzle longitudinal axis by virtue of first link 56. This link transfers the clockwise rotation of the bell crank 50 to clockwise rotation of the first blocker crank 68 with respect to eccentric 76. Essentially, the point of connection 69 of the first blocker crank 68 and first link 56 is translated upward a distance Y in FIG. 2 equal to the vertical travel of first blocker crank pin axis 74. Therefore, first blocker crank 68 and blocker door 44 are caused to move in vertical translation with respect to the exhaust nozzle casing 18.

Referring now to FIG. 3 wherein actuator rod 40 is fully extended, having caused further clockwise rotation of bell crank 50. During the actuation from FIG. 2 to FIG. 3, the arcuate second link 58 is forced to pull upon second blocker crank 70 thereby causing a rotation of blocker door 46 about its pin axis of rotation 72. FIG. 3 depicts blocker door 46 deployed over a portion of second exhaust port 16. Contemporaneous with the rotation of blocker door 46, clockwise rotation of bell crank 50 induces, through link 56, counterclockwise rotation of first blocker crank 68 about its pin axis 74 and, through link 60, clockwise rotation of eccentric 76 about its axis of rotation 78. Thus, blocker door 44 is rotated counterclockwise to a deployed position over a portion of second exhaust port 16 where it cooperates with blocker door 46 to preclude fluid flow therethrough. Significantly, though the first blocker door 44 was caused to rotate in a counterclockwise direction with respect to its rotational axis 74, axis 74 was simultaneously rotated clockwise about eccentric axis 78 such that the vertical travel X (defined in FIG. 2) once again became zero in FIG. 3, thereby seating at least a portion of seal 94 upon valve seat 92. Though not shown, it is readily apparent that seals of a known variety may be disposed upon either or both of the blocker doors at their point of cooperation 95 to minimize the leakage of flow therethrough.

Therefore, two distinct types of motion occur as blocker door 44 is moved from a first position covering first exhaust port 14 to a position covering second exhaust port 16. First is lifting of the door 44 and seal 94 from their first position of FIG. 1 to a second position of FIG. 2. Thereafter, the door 44 is rotated to the third position of FIG. 3. The extremely high pressures within the exhaust nozzle, in the order ot 50 psi, preclude turning the door 44 without lifting since the conformable seal would be destroyed and the tight fit would require massive actuation devices.

The benefits of the present invention are evident when considering the prior art attempts at solving the sealing problem. FIGS. 10 and 11 represent a typical prior state-of-the-art diverter valve assembly 100 covering exhaust port 102. Blocker door 104 is provided with a pair of bumper seals 106, 108 which cooperate with bumper seals 110, 112, respectively, on the exhaust port perimeter to prevent flow therethrough. This concept is taught in U.S. Pat. No. 3,035,411, Porowski, "Thrust Reverser Actuating Mechanism," which is assigned to the same assignee as the present invention. As shown in FIG. 11, by virtue of mechanical necessity, regions of no-sealing 116, 118 exist on the perimeter proximate the blocker door rotational axis 114. Further leakage exists through gaps 122, 124 between the bumper seals with the door in either its stowed position over exhaust port 102 or in its deployed position shown in phantom. Thermal growth in sheet metal construction requires such gaps in a bumper seal configuration in order to provide free rotation of the blocker door 104. The resultant leakage is deleterious to overall engine performance.

Conversely, as FIG. 1 depicts, the seal arrangement of the present invention with the continuous conformable seal 94 seated upon the valve seat 92 provides no evidence of gaps through which leakage flow can escape.

FIGS. 4, 5 and 6 depict, sequentially, the functioning of an alternative embodiment of the present invention incorporating a single modified blocker door 244. Here a slightly modified bell crank 250 is caused to rotate about axis of rotation 254 by the translating motion of actuator arm 40 of actuator 30. As depicted in the sequence of FIGS. 4 and 5, a first translation of actuator arm 240 and associated counterclockwise rotation of bell crank 250 causes modified eccentric 276 to rotate in a clockwise direction through connection with links 260 and lifting cam 282, while bell crank 268 is induced to rotate in compensating counterclockwise rotation through the operative connection with link 256. This results in a lifting translation of blocker door 44 as its axis of rotation 274 orbits about the eccentric axis of rotation 278 in a manner similar to the previous embodiment. This produces lifting disengagement of seal 94 from valve seat 92. The door 244 and seal 94 are now rotated to a deployed position in sealing engagement with exhaust nozzle 16 (as depicted in FIG. 6) by further extension of actuator arm 240 and corresponding rotation of bell crank 250. This causes the eccentric 276 to reverse direction of rotation such that it rotates in the same direction as blocker crank 268. This cooperation rotates blocker door 244 to its predetermined deployed third position over exhaust port 16, thus directing fluid through exhaust port 14. Again, the essential elements of the present invention are demonstrated: first, a lifting of blocker door 244 and seal 94 from engagement with valve seat 92 followed by a rotation of the blocker door to the deployed position over exhaust port 16.

Yet another embodiment of the present invention is depicted sequentially in FIGS. 7 through 9 wherein a translating exhaust duct liner 300 has been added to provide thermal protection for the exhaust nozzle 10. Since the liner 300 interferes with the free actuation of the somewhat modified blocker door 344, a means is provided to slide the liner 300 aft during blocker door actuation.

In the absence of a bell crank assembly, an actuator arm extension 400 has been added to the end of actuator arm 340 and is disposed to ride in sliding engagement with first track 402 which is fixed with respect to exhaust nozzle casing 18. A first extension of actuator arm 340 (as depicted in FIGS. 7 and 8) produces the lifting of blocker door 344 and seal 94 from valve seat 92. This first extension causes, through the operative connection of link 360, clockwise rotation of the eccentric 376 about its axis of rotation 378, thereby carrying blocker crank 368 in orbital motion about axis of rotation 378. A link 356, however, induces a compensating counterrotation of the blocker crank 368 about its axis of rotation 74 resulting in a lifting of blocker crank 368 and integrally connected blocker door 344, and this permits disengagement of seal 94 from valve seat 92. Further rotation of eccentric 376 and counterrotation of blocker crank 368 rotates blocker door 344 to its deployed position over exhaust duct 16 (FIG. 9). A second track 404 fixed with respect to exhaust nozzle casing 18 is adapted to slidingly receive slider 406 which is operatively connected to translating liner 300. Link 408 connects slider 406 and actuator arm extension 400 such that sliding motion of actuator arm extension 400 is transferred to the slider 406 simultaneous with actuation of door 344. Tracks 402 and 404 ensure parallel travel. Again, the essential elements of lifting and rotating are present in the blocker door actuation sequence.

It should be obvious to one skilled in the art that certain changes can be made to the above-described invention without departing from the broad inventive concepts thereof. For example, the invention can be utilized to divert the fan stream of a gas turbine engine as well as the core engine exhaust stream; the seal could be affixed to the nozzle duct valve seat rather than the blocker door; advanced deformable, heat resistant materials other than honeycomb may prove acceptable in some seal applications; and, liner actuation of FIGS. 7, 8 and 9 may be eliminated. It is intended that the appended claims cover these and all other variations in the present invention's broader inventive concepts.

What I claim is:

1. In a gas turbine engine exhaust nozzle comprising a flow path having an inlet and at least two exhaust ports, an improved diverter valve to selectively direct the motive fluid stream through one of said nozzle exhaust ports, and to provide improved sealing to prevent the flow of fluid through said other nozzle exhaust port, said diverter valve comprising:
   first and second blocking means disposed within said nozzle;
   an actuator having a translating actuator arm; and
   linkage means for operatively connecting said actuator arm to said first and second blocking means, said linkage means adapted to convert the translating stroke of said actuator arm into motion to simultaneously:
   retract and disengage said first blocking means from a sealing surface about the first nozzle exhaust port and thereafter rotate said first blocking means to a deployed position at least partially blocking the second exhaust port; and
   rotate said second blocking means from a stowed position in essentially coaxial spacial relationship with said nozzle flow path and essentially diametrically opposed to said first blocking means to a deployed position whereat it cooperates with said first blocking means to substantially prohibit the flow of motive fluid through the second exhaust port.

2. The improved diverter valve of claim 1 wherein said first and second blocking means comprise first and second blocker doors, respectively.

3. The improved diverter valve of claim 1 wherein said actuator comprises a cylinder and piston disposed therein, the cylinder having a free end and a closed end, said closed end operatively connected to said exhaust nozzle, and said piston having said actuator arm attached thereto and extending from said cylinder free end.

4. The improved diverter valve of claim 1 wherein the first nozzle exhaust port comprises an inlet to a nozzle of the articulated, thrust vectoring type.

5. The improved diverter valve of claim 2 further comprising a seal disposed between the first blocker door and the sealing surface to prevent fluid flow therethrough when said first blocker door is engaged over the first exhaust port and wherein said seal is continuous and conformable to both said first blocker door and said first nozzle exhaust port.

6. The improved diverter valve of claim 5 wherein said continuous conformable seal is affixed to said first blocker door.

7. The improved diverter valve of claim 2 wherein said linkage means comprises:
   an eccentric having a fixed axis of rotation with respect to said nozzle;
   a first blocker crank rigidly connected to said first blocker door and operatively connected to said eccentric at a point radially disposed from said eccentric rotational axis, said first blocker crank pivotable about the point of connection with said eccentric;
   a second blocker crank rigidly connected to said second blocker door;
   a bell crank operatively connected to said actuator arm and having an axis of rotation fixed with respect to said nozzle such that the translating motion of said actuator arm is converted to rotational motion of the bell crank about its axis;
   a first link operatively connecting said bell crank and said first blocker crank;
   a second link operatively connecting said bell crank and said second blocker crank; and
   a third link operatively connecting said bell crank and said eccentric, said point of connection with said eccentric being in essentially radial alignment with the eccentric axis of rotation and the point of connection for said first blocker crank, and radially outward of said point of connection for said first blocker crank, such that
   a first predetermined rotational motion of said bell crank and its rotational axis, in cooperation with said first and second links operatively connected thereto, produces rotation of said eccentric and compensating counterrotation of said first blocker crank about their respective axes, such that said compensating rotational motions are converted to an essentially translating motion within said first blocker crank thereby causing radially inward lifting of the first blocker door from its first to its second predetermined position; and
   a second predetermined rotational motion of said bell crank, in cooperation with said first, second and third links operatively connected thereto, causes the directions of rotation of said eccentric and said first blocker crank to reverse, and said first and second blocker doors to rotate to their respective deployed positions.

8. In a gas turbine engine exhaust nozzle comprising a flow path having an inlet and at least two exhaust ports, an improved diverter valve to selectively direct the motive fluid stream through one of said nozzle exhaust ports, and to provide improved sealing to prevent the flow of fluid through said other nozzle exhaust port, said diverter valve comprising:

at least one blocking means disposed within said nozzle;

an actuator having a translating actuator arm; and linkage means for operatively connecting said actuator to said blocking means, said actuator and said linkage means cooperating to move said blocking means between a plurality of predetermined positions within said nozzle; said diverter valve further including seal means disposed between the blocking means and said first nozzle port to prevent fluid flow therethrough when said blocking means is in a first predetermined position; and wherein said linkage means comprises:

an eccentric having a fixed axis of rotation with respect to said nozzle;

a blocker crank rigidly connected to said blocking means and operatively connected to said eccentric at a point radially disposed from said eccentric rotational axis, said blocker crank pivotable about the point of connection with said eccentric;

a bell crank operatively connected to said actuator arm and having an axis of rotation fixed with respect to said nozzle such that the translating motion of said actuator arm is converted to rotational motion of the bell crank about its axis;

a first link operatively connecting said bell crank and said blocker crank; and a second link operatively connecting said bell crank and said eccentric for rotating said eccentric about its axis of rotation, such that:

a first predetermined rotation of said bell crank about its rotational axis in cooperation with said first and second links operatively connected thereto, produces rotation of said eccentric and compensating counterrotation of said blocker crank about their respective axes, thereby producing radially inward lifting of the blocking means from a first to a second predetermined position wherein said seal is disengaged, thus eliminating sliding frictional contact between said blocking means and said first nozzle port during movement of said blocking means between its first and its second predetermined positions, and a second predetermined rotation of said bell crank about its rotational axis in cooperation with said first and second links causes said eccentric to reverse direction of rotation, thereby rotating in the same direction as the blocker crank and cooperating to rotate said blocking means to a third predetermined position, thus preventing the flow of fluid through said second nozzle exhaust port.

9. In a gas turbine engine exhaust nozzle comprising a flow path having an inlet and at least two exhaust ports, an improved diverter valve to selectively direct the motive fluid stream through one of said nozzle exhaust ports, and to provide improved sealing to prevent the flow of fluid through said other nozzle exhaust port, said diverter valve comprising:

at least one blocking means disposed within said nozzle;

an actuator including a cylinder and piston disposed therein, the cylinder having a free end and a closed end, said closed end operatively connected to said exhaust nozzle, and said piston having an actuator arm attached thereto and extending from said cylinder free end;

an actuator arm extension operatively connected to said actuator arm;

linkage means for operatively connecting said actuator to said blocking means, said actuator and said linkage means cooperating to move said blocking means between a plurality of predetermined positions within said nozzle; said diverter valve further including seal means disposed between the blocking means and said first nozzle port to prevent fluid flow therethrough when said blocking means is in a first predetermined position; and wherein said linkage means comprises:

a first essentially axially oriented track disposed to carry said actuator arm extension in sliding movement;

an eccentric having a fixed axis of rotation with respect to said nozzle;

a blocker crank rigidly connected to said blocking means and operatively connected to said eccentric at a point radially disposed from said eccentric rotational axis, said blocker crank pivotable about said point of connection with said eccentric;

a first link operatively connecting said actuator arm extension and said blocker crank to convert the sliding motion of said actuator arm extension to rotary motion of said blocker crank about its point of connection with said eccentric; and a second link operatively connecting said actuator arm extension to said eccentric for rotating said eccentric about its axis of rotation; such that a first predetermined displacement of said actuator arm extension along said first track, in cooperation with said first and second links, operatively connected thereto, produces rotation of said eccentric and compensating counterrotation of said blocker crank about their respective axes, thereby causing radially inward lifting of the blocker door from a first to a second predetermined position wherein said seal is disengaged, thereby eliminating sliding frictional contact between said blocking means and said first nozzle port during movement of said blocking means between its first and its second predetermined positions, and a further second predetermined displacement of said actuator arm extension along its first track causes said eccentric and said blocker crank to rotate said blocking means from its second to a third predetermined position thereby directing fluid flow through said first nozzle exhaust port.

10. The improved diverter valve of claim 9 wherein said second nozzle exhaust port includes:

an essentially rigid cylindrical nozzle housing; and a thermal liner positionable with respect to and essentially coaxial with said nozzle housing and disposed therein.

11. The improved diverter valve of claim 10 wherein said thermal liner is axially positionable with respect to said nozzle housing.

12. The improved diverter valve of claim 11 wherein said thermal liner is disposed at an axially forward first operating position proximate said blocker door when said blocker door is disposed at its first predetermined position.

13. The improved diverter valve of claim 12 wherein said thermal liner is disposed at a second operating position axially disposed from said first operating position and remote from said blocker door when said blocker door is in its third operating position.

14. The improved diverter valve of claim 13 wherein said linkage means further comprises:
   a slider operatively connected to said thermal liner;
   a second essentially axially oriented track operatively connected to said exhaust nozzle and disposed to carry said slider in sliding movement; and
   a third link operatively connecting said actuator arm extension and said slider such that the sliding motion of the actuator arm is transferred to said slider thereby positioning said thermal liner between its first and second operating positions.

* * * * *

UNITED STATES PATENT OFFICE
CERTIFICATE OF CORRECTION

PATENT NO. : 3,943,707
DATED : MARCH 16, 1976
INVENTOR(S) : DUDLEY O. NASH

It is certified that error appears in the above-identified patent and that said Letters Patent are hereby corrected as shown below:

Column 8, line 50, "crank and its" should read --crank about its--.

Signed and Sealed this fifteenth Day of June 1976

[SEAL]

Attest:

RUTH C. MASON
*Attesting Officer*

C. MARSHALL DANN
*Commissioner of Patents and Trademarks*